Oct. 12, 1926.
E. E. LEHR
1,602,911
REGULATOR
Filed April 13, 1922
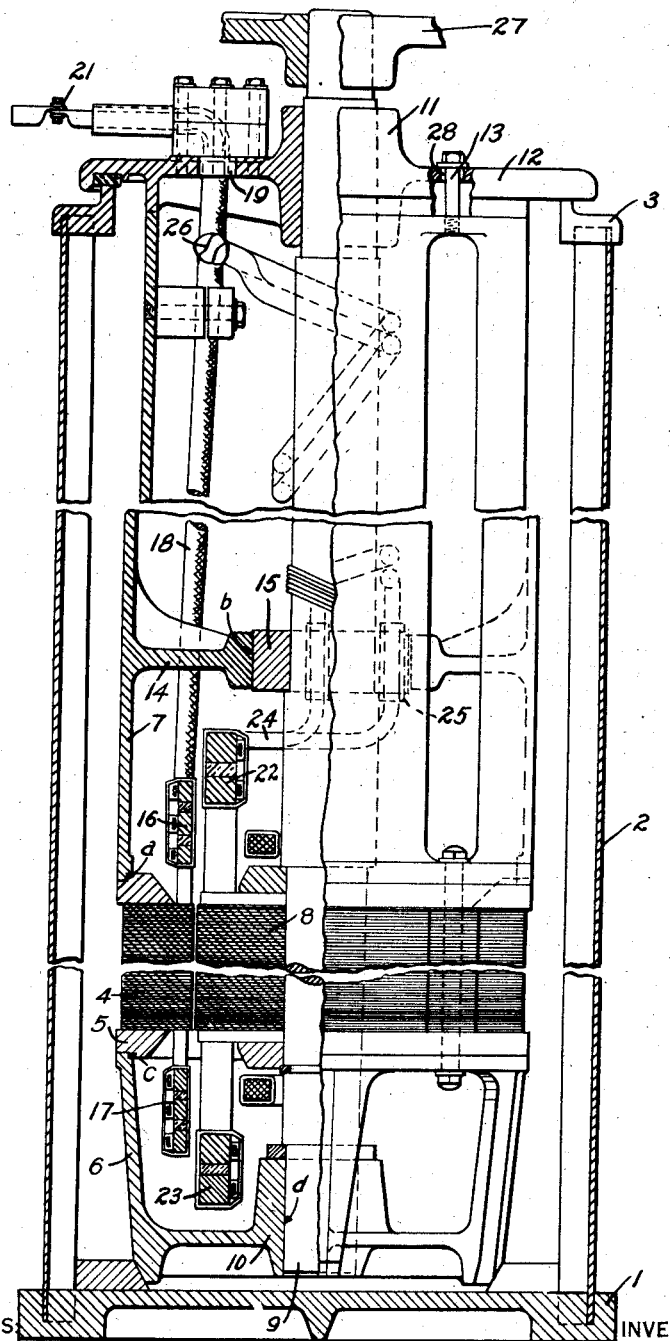
WITNESSES
*A. L. Jeffrey*
*M. Theodore Simmons*
INVENTOR
*Edwin E. Lehr*
BY
*Wesley G. Carr*
ATTORNEY Patented Oct. 12, 1926.

1,602,911

UNITED STATES PATENT OFFICE.

EDWIN E. LEHR, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR.

Application filed April 13, 1922. Serial No. 552,276.

My invention relates to regulator mechanisms and it has special reference to induction regulators.

One object of my invention is to provide a new and improved construction for regulator mechanisms of the above-indicated character that shall afford improved operation and that shall insure easier assembly of the mechanism.

In constructing induction regulators, it has heretofore been customary to provide the shaft, upon which is mounted the rotor of the regulator, with bearings at the upper and lower ends thereof. This shaft must be comparatively long in order to provide a sufficient cooling surface for the regulator. Proper alinement of the shaft is essential to insure a uniform air gap between the windings, and to prevent vibrations and noise in the operation of the regulator. In order to properly aline the bearings for the shaft, numerous individual machining operations and numerous fittings were necessary.

In the improved form of the regulator, an intermediate bearing is provided near the upper end of the stator winding of the regulator. In the construction having the intermediate bearing, it is only necessary to accurately aline two of the bearings, thereby rendering the machining operations relatively simple, less in number, and combinable.

It was formerly necessary to machine the ends of the brackets that retain the windings separately, and machine the bearings separately. With an intermediate bearing in the upper bracket, the machining can now be done with one setting of each bracket upon the boring mill and two surfaces may be machined at the same time, thereby insuring that they are concentric. In alining the shaft, the intermediate and lower bearings are accurately alined, and the third bearing is adapted to be self-alining.

My invention is illustrated in the accompanying drawings, wherein the single figure is a side elevation, partly in section and partly broken away to facilitate the illustration.

The regulator is provided with a base 1, having mounted thereupon an outer casing 2, surmounting which is a casting 3. The stator winding 4, having end plates 5, is located within the casing 2. A lower bracket 6 and an upper bracket 7 co-operate with the end plates 5.

The rotor winding 8 is mounted upon a shaft 9 which extends through the casing 2 and terminates above the same. It is journaled at its lower end in a bearing 10 that is integral with the lower bracket 6. The shaft 9 is provided at its upper end with a bearing 11 that is integral with the cover 12 of the regulator. The cover 12 rests upon the casting 3 and is secured to the upper bracket 7 by a plurality of bolts, as illustrated at 13 in the drawing.

In the present construction, the shaft 9 is provided with an intermediate bearing 14 that is located above the top of the windings 4 and 8, and is integral with the upper bracket 7. The bearing 14 engages with a collar 15 mounted upon the shaft 9 for a purpose hereinafter set forth.

The terminals of the stator winding are indicated respectively at 16 and 17 and are connected by means of a cable 18, which extends through a slot 19 in the cover 12, to the outside terminal 21. The rotor terminals are indicated at 22 and 23 and are connected by means of the cables 24 that extend through tubes 25 in the collar 15, provided for that purpose, and encircle the shaft 9, to the cable 18 and a corresponding terminal 21. The cables 24 and the cable 18 are spliced, as indicated at 26.

The rotor shaft 9 is operated by means of a gear wheel 27, which is mounted upon that portion of the shaft 9 extending outside the casing 2. The gear wheel is adapted to mesh with a worm that is operated by a controlled motor in the customary manner. None of the control apparatus is indicated except a portion of the gear 27, since it is not a part of the present invention.

In the assembly of the described apparatus, the casting 7 is machined at the surfaces $a$ and $b$ only, and this machining is done at one operation, thereby insuring the concentricity of the two surfaces. The lower bracket is machined at the surfaces $c$ and $d$ only, and as in the case of the upper bracket, these surfaces are machined simultaneously. The bearings 10 and 14 are then accurately alined. In order that it may not be necessary to machine any parts of the apparatus to aline the bearing 11 with the other bearings, the cover is made adjustable and the bearing 11 self-alined. The cover is rendered adjustable by having the bolt holes 28 and the other apertures in the cover 12 slightly larger than is otherwise necessary.

Modifications in the arrangement and location of parts may be made within the spirit and scope of my invention, and such modifications are intended to be covered by the appended claims.

I claim as my invention:—

1. In an induction regulator, a stator provided with upper and lower end plates, a bracket supporting said stator and provided with a bearing and an alined end-plate-engaging surface, a bracket mounted upon said stator and provided with an aligned bearing and end-plate-engaging surface, said bracket having an upwardly extending portion, a cover secured to said upwardly extending portion and provided with a bearing, a shaft adapted to be mounted in said bearings, and a rotor mounted upon said shaft.

2. In an induction regulator, a stator, a rotor winding coöperating therewith, said stator having upper and lower end plates provided with alining machined surfaces, upper and lower brackets provided with bearings and with alined machined surfaces adapted to engage the alining machined surfaces of said end plates for maintaining said bearings in alinement with said stator winding, a shaft upon which said rotor is mounted, said shaft being adapted to be mounted in said bearings.

3. In an induction regulator, a stator provided with upper and lower end plates, upper and lower brackets provided with bearings and having surfaces adapted to cooperate with said end plates to maintain said bearings and stator in alinement, a cover provided with a bearing secured to said upper bracket, said cover being adjustable to permit self-alining of said bearing.

4. In an induction regulator, a stator, a lower bracket provided with a bearing, said lower bracket being adapted to support said stator, an upper bracket provided with a bearing and adapted to rest upon said stator, means for alining said brackets and said stator, and means for securing together said brackets and said stator, a cover secured to said upper bracket, said cover being provided with a bearing and being adjustable to permit self-alining of said bearing, a shaft adapted to be mounted in said bearings, and a rotor mounted on said shaft.

5. An induction regulator having an outer casing, a stator and a rotor winding within said casing, a shaft upon which said rotor winding is mounted, and a plurality of bearings for said shaft at least two of which are located within said casing, a cover for said casing carrying one of said bearings, said cover being adjustable to permit self-alining of said bearing.

In testimony whereof, I have hereunto subscribed my name this 10th day of April 1922.

EDWIN E. LEHR.